(12) United States Patent
Rabisse et al.

(10) Patent No.: US 11,006,736 B2
(45) Date of Patent: May 18, 2021

(54) LIMITED PIVOT QUICK CONNECT

(71) Applicant: Klein Tools, Inc., Lincolnshire, IL (US)

(72) Inventors: Jean H. Rabisse, Deerfield, IL (US);
John H. Kargenian, Prospect Heights, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 0 days.

(21) Appl. No.: 16/536,585

(22) Filed: Aug. 9, 2019

(65) Prior Publication Data
US 2021/0037955 A1 Feb. 11, 2021

(51) Int. Cl.
*A45F 3/14* (2006.01)
*F16B 2/02* (2006.01)

(52) U.S. Cl.
CPC ............. *A45F 3/14* (2013.01); *F16B 2/02* (2013.01); *A45F 2003/144* (2013.01)

(58) Field of Classification Search
CPC .......... A45F 2005/025; A45F 5/021; A45F 2005/026; A45F 2005/027; A45F 2200/0575; F41C 33/045; Y10S 224/904
See application file for complete search history.

(56) References Cited

U.S. PATENT DOCUMENTS

| | | | | |
|---|---|---|---|---|
| 3,261,519 A * | 7/1966 | Horne | F41C 33/045 | 224/198 |
| 4,419,794 A * | 12/1983 | Horton, Jr. | A45F 5/02 | 224/197 |
| 4,504,001 A * | 3/1985 | Nichols | F41C 33/045 | 224/198 |
| 4,718,586 A * | 1/1988 | Hagino | A45F 5/02 | 224/197 |
| 5,018,653 A * | 5/1991 | Shoemaker | F41C 33/0227 | 224/193 |
| 5,421,497 A * | 6/1995 | Gilmore | A45F 5/00 | 224/192 |
| 5,452,497 A * | 9/1995 | Peng | A45F 5/02 | 224/197 |
| 5,501,381 A * | 3/1996 | Rogers | F41C 33/0227 | 224/243 |
| 5,597,102 A * | 1/1997 | Saarikko | H04B 1/3822 | 224/197 |
| 5,598,958 A * | 2/1997 | Ryan, III | F41C 33/0245 | 224/198 |
| 5,641,102 A * | 6/1997 | Hellweg | A45F 5/00 | 224/198 |
| 5,906,031 A * | 5/1999 | Jensen | A45F 5/02 | 24/3.11 |
| 6,341,918 B1* | 1/2002 | Liindberg | A45F 5/021 | 24/3.12 |
| 6,604,657 B2* | 8/2003 | Yirmiyahu | F41C 33/0227 | 224/243 |
| 6,685,067 B2* | 2/2004 | French | F41C 33/0227 | 224/192 |
| 7,461,765 B2* | 12/2008 | French | F41C 33/0227 | 224/243 |
| 7,866,515 B1* | 1/2011 | Buis, III | F41C 33/043 | 224/197 |
| 8,424,817 B1* | 4/2013 | Chen | B25H 3/00 | 248/113 |

(Continued)

*Primary Examiner* — Brian D Nash

(57) ABSTRACT

A quick connect is provided to releasably connect two objects while allowing a limited pivot motion between the two connected objects.

19 Claims, 16 Drawing Sheets

(56) References Cited

U.S. PATENT DOCUMENTS

| | | | | |
|---|---|---|---|---|
| 8,602,275 | B1* | 12/2013 | Kiger | F41C 33/0263 |
| | | | | 224/243 |
| 10,782,094 | B2* | 9/2020 | Rogers | A45F 5/021 |
| 2003/0085244 | A1* | 5/2003 | Parsons | A45F 5/02 |
| | | | | 224/197 |
| 2003/0160075 | A1* | 8/2003 | Musarella | A45F 5/02 |
| | | | | 224/269 |
| 2006/0196902 | A1* | 9/2006 | Chen | A45F 5/02 |
| | | | | 224/197 |
| 2007/0241159 | A1* | 10/2007 | Chang | A45F 5/02 |
| | | | | 224/677 |
| 2007/0278266 | A1* | 12/2007 | Parsons | F41C 33/045 |
| | | | | 224/197 |
| 2008/0156836 | A1* | 7/2008 | Wadsworth | A45F 5/021 |
| | | | | 224/269 |
| 2010/0200628 | A1* | 8/2010 | Tages | A45F 5/02 |
| | | | | 224/269 |
| 2013/0126565 | A1* | 5/2013 | Rostami | G06F 1/1632 |
| | | | | 224/191 |
| 2013/0284772 | A1* | 10/2013 | Paugh | A45F 5/004 |
| | | | | 224/162 |
| 2014/0159640 | A1* | 6/2014 | Yoshikawa | A41F 9/002 |
| | | | | 320/103 |
| 2014/0239023 | A1* | 8/2014 | Tyybakinoja | F41C 33/045 |
| | | | | 224/197 |
| 2019/0219359 | A1* | 7/2019 | Rogers | F41C 33/045 |
| 2019/0335884 | A1* | 11/2019 | Zamarron | A45F 5/021 |

* cited by examiner

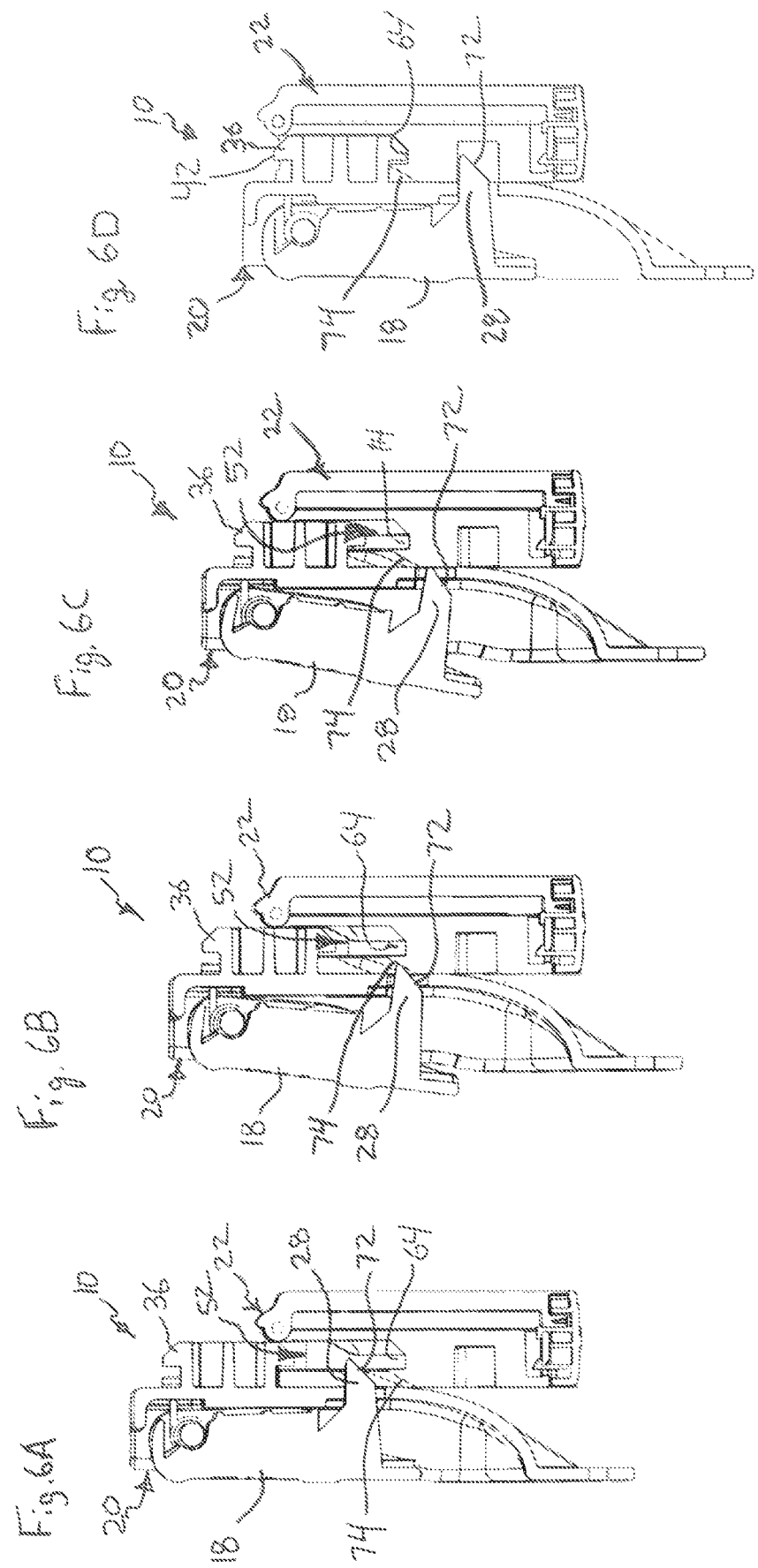

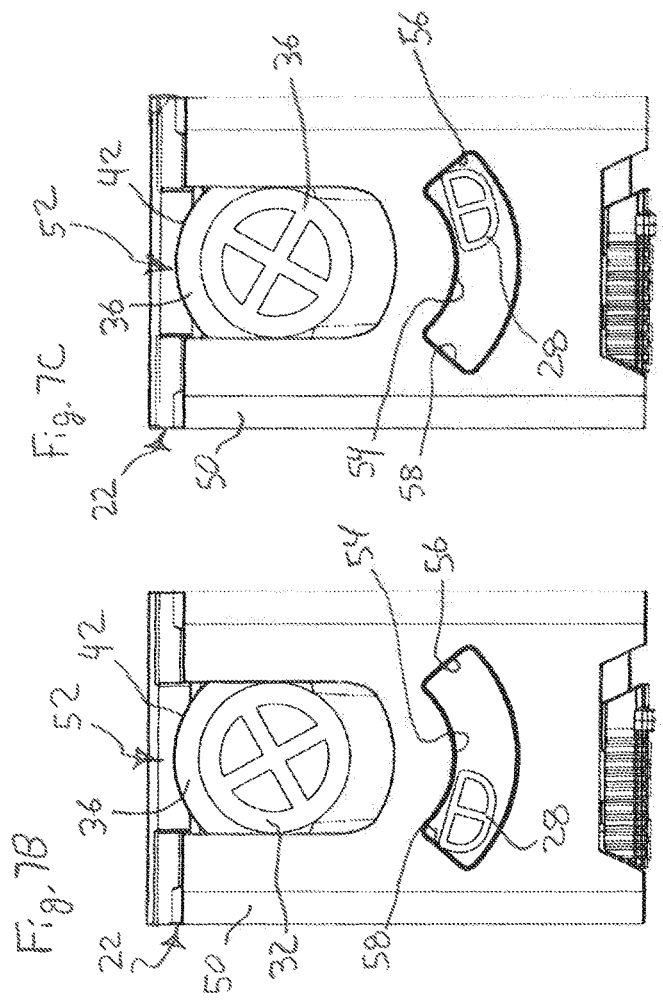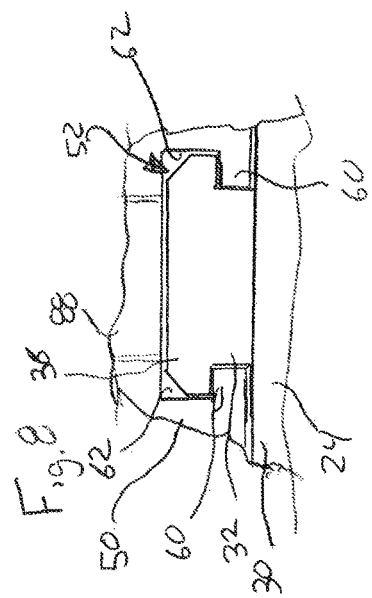

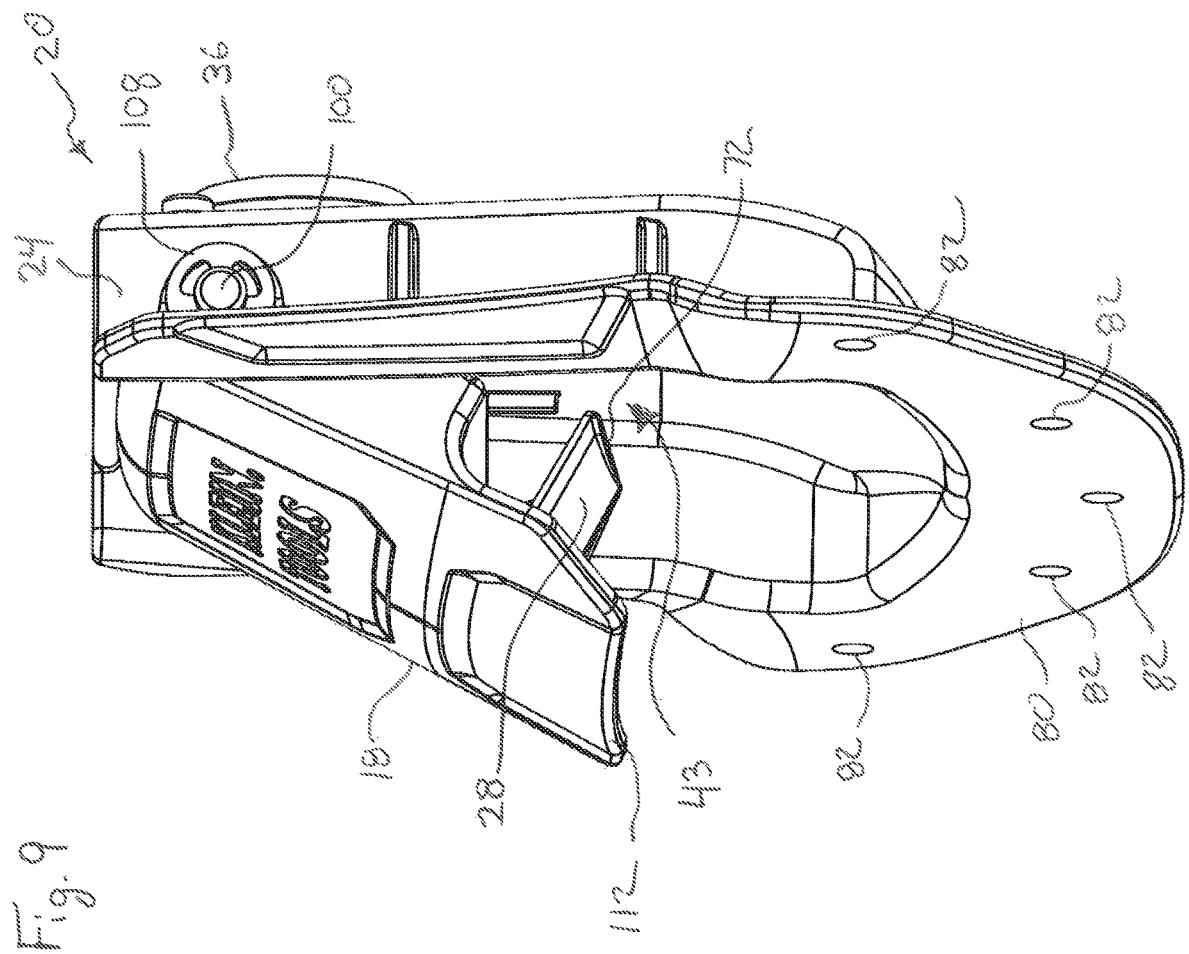

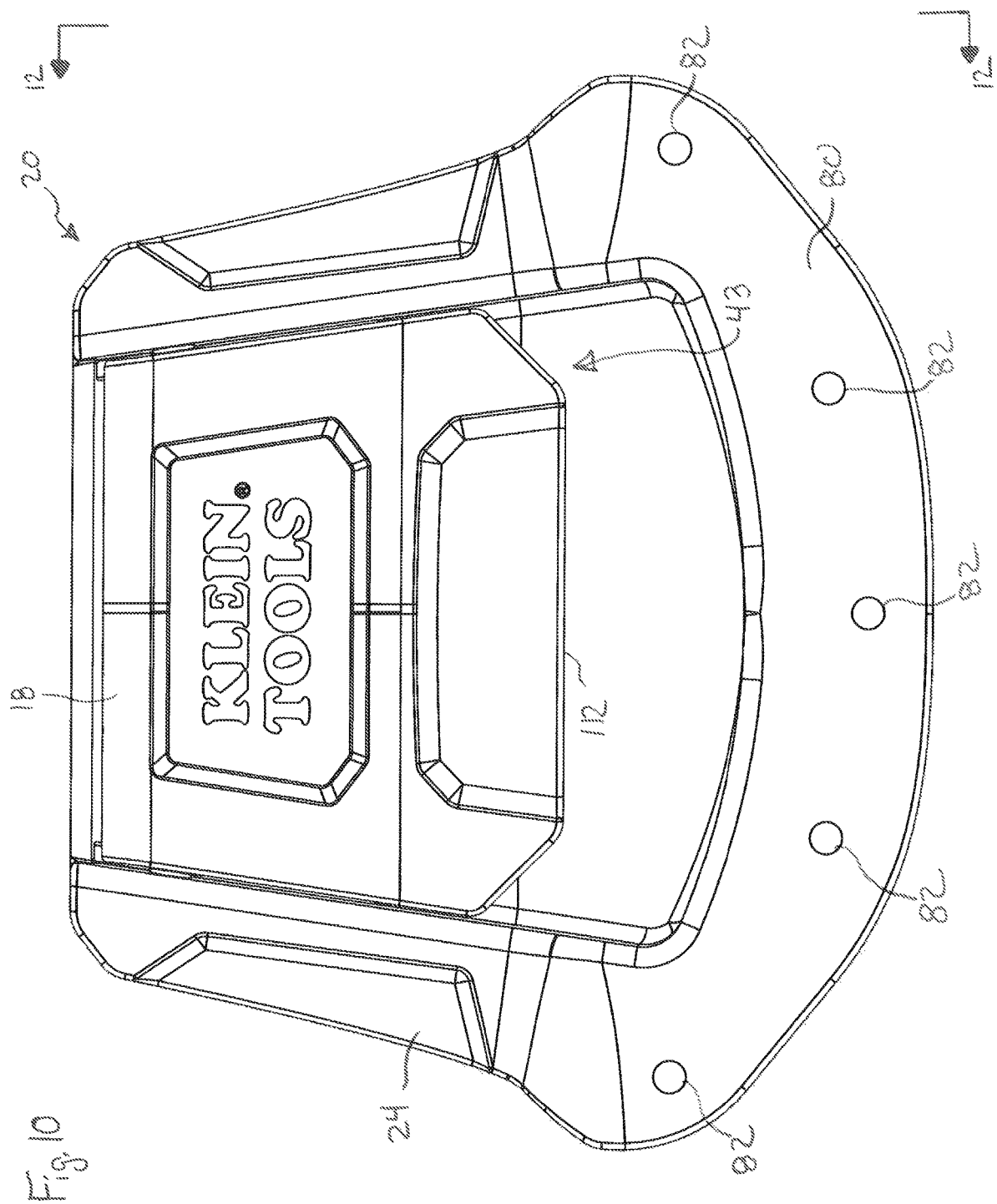

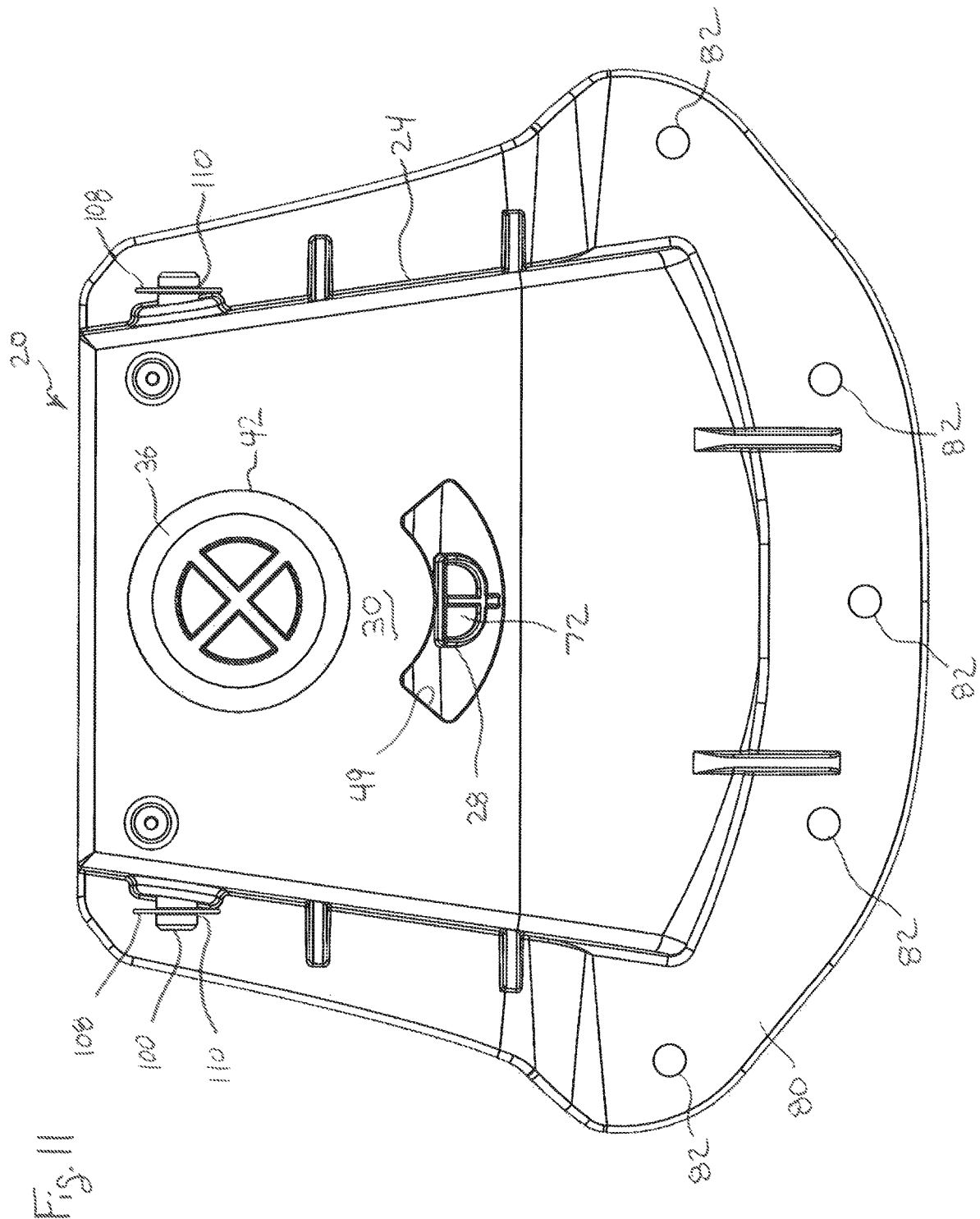

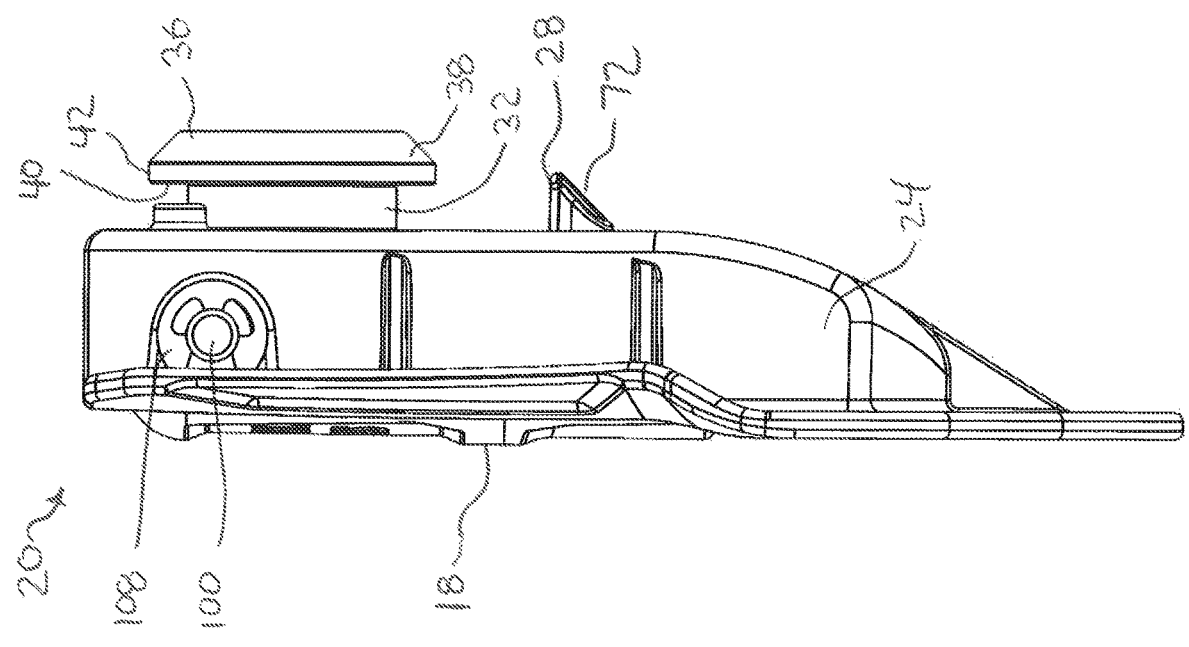

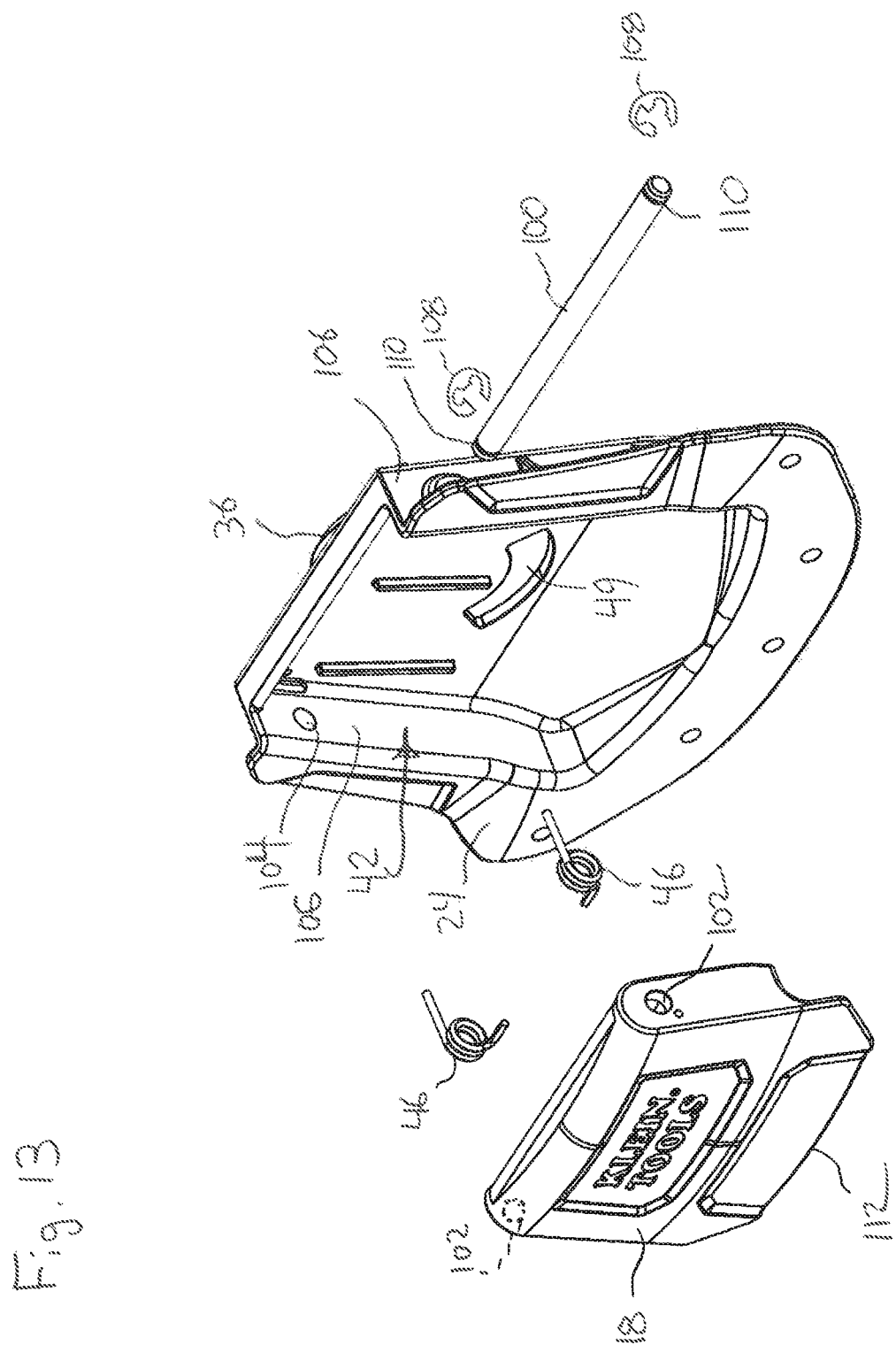

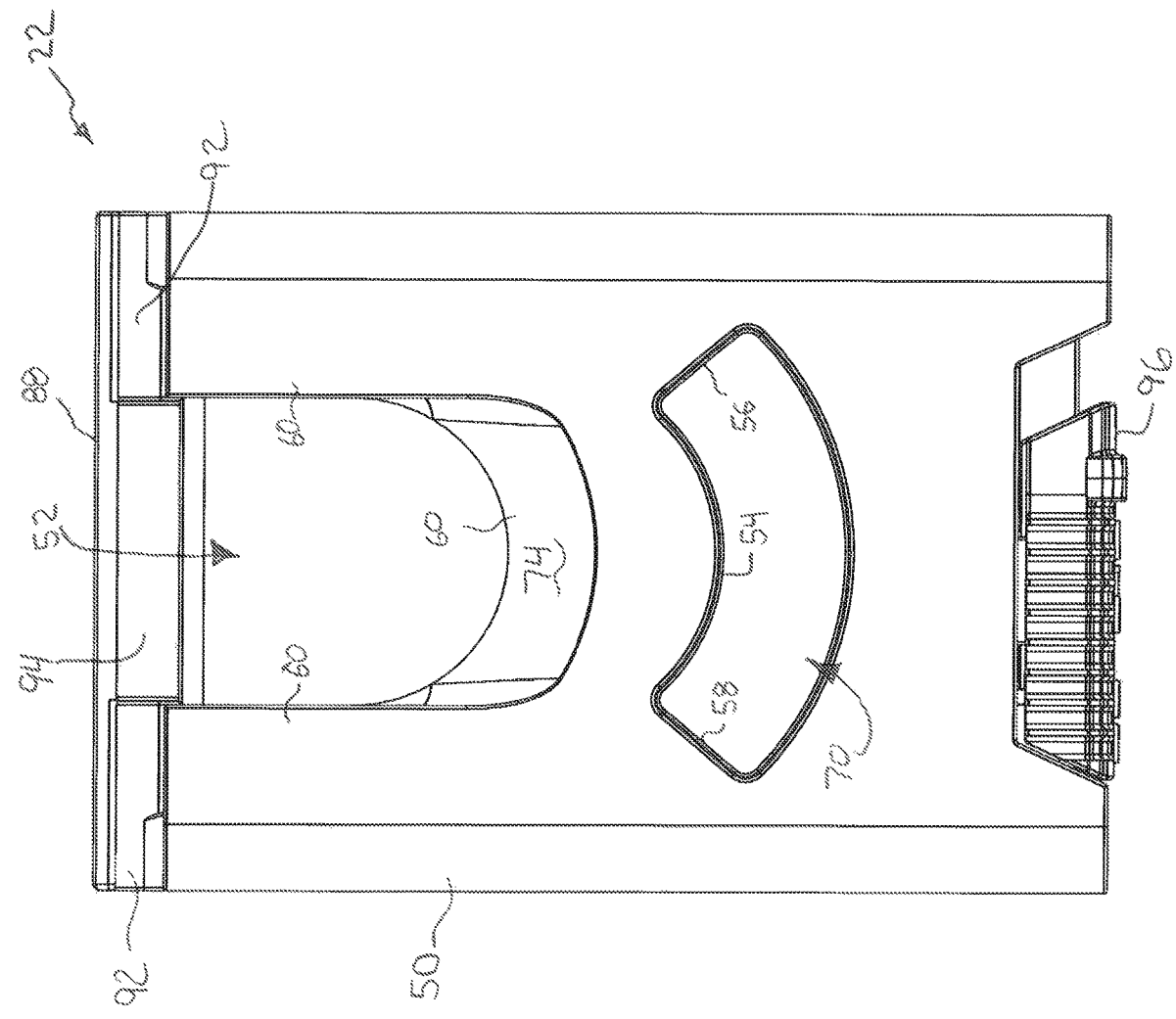

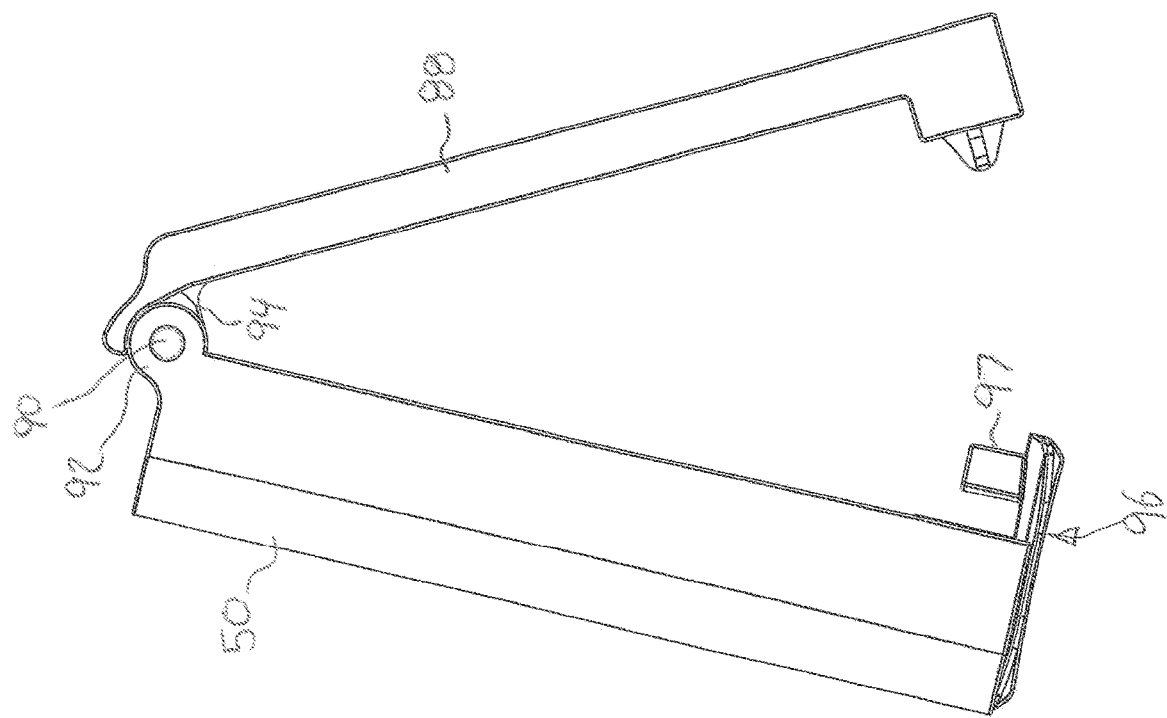

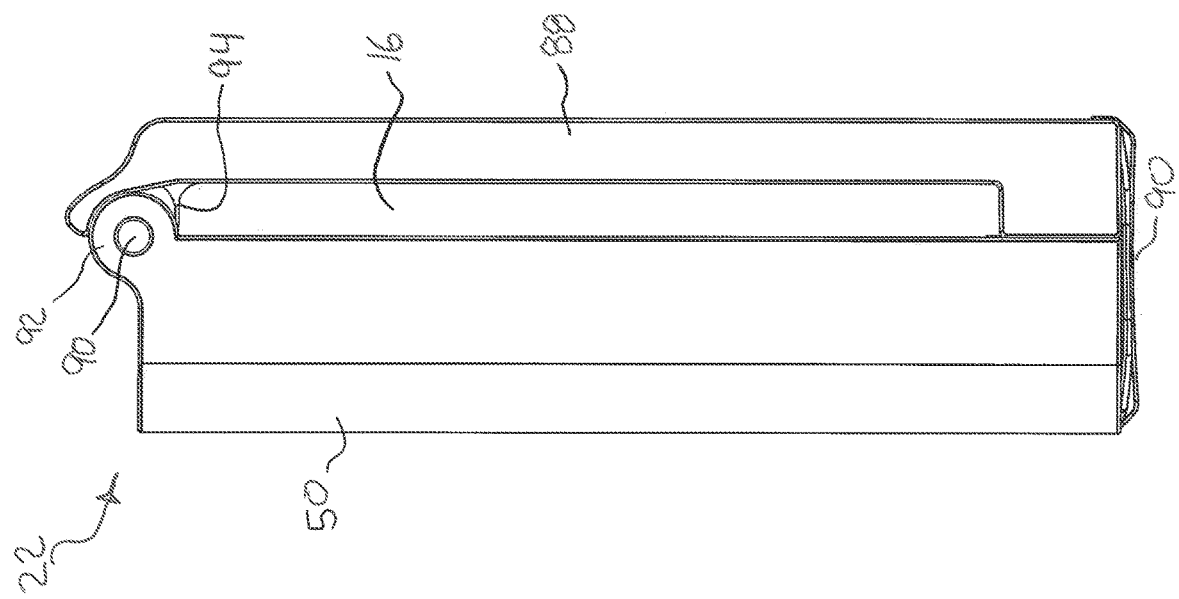

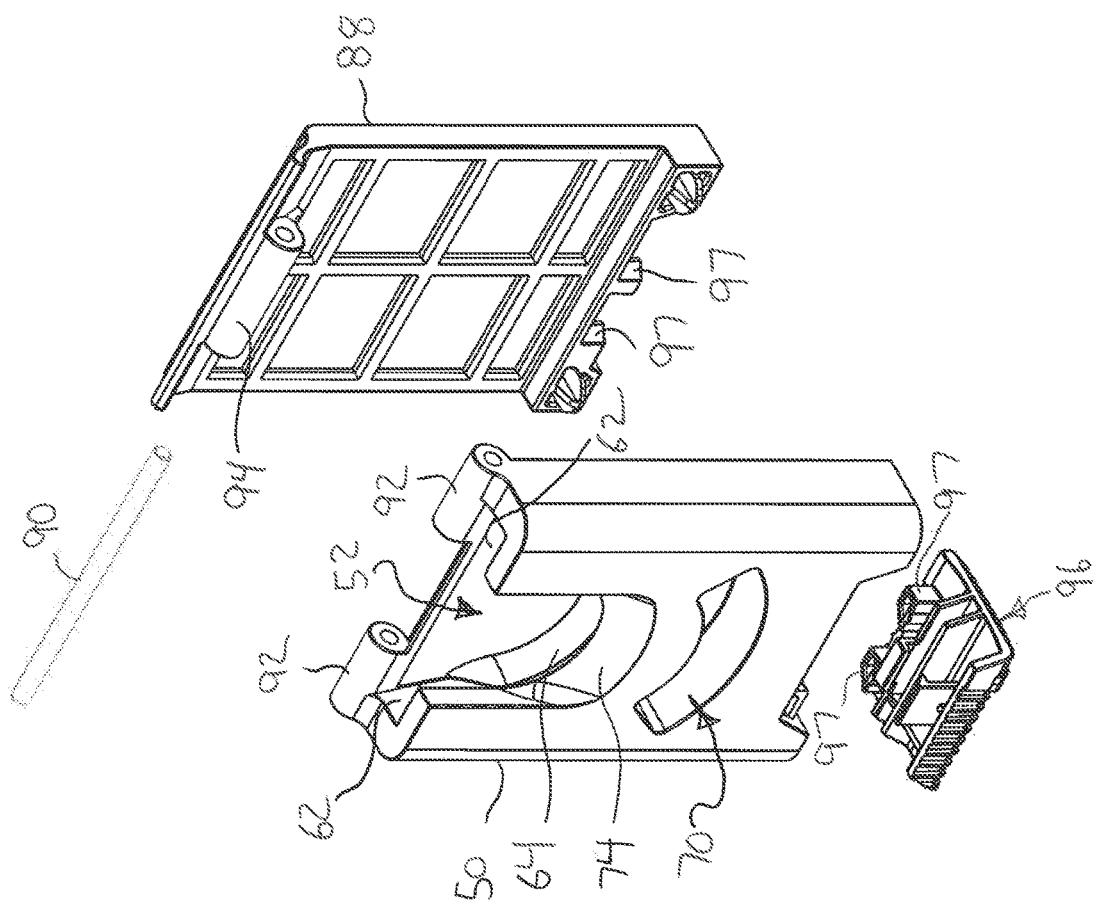

LIMITED PIVOT QUICK CONNECT

CROSS-REFERENCE TO RELATED APPLICATIONS

None

BACKGROUND OF THE DISCLOSURE

The present disclosure relates apparatus/devices that allow two objects to be quickly connected to each other and disconnected from each other, while allowing the objects to pivot relative to each other while connected, and in more particular applications to such devices when used to connect a tool holder/pouch to a tool belt.

BRIEF SUMMARY OF THE DISCLOSURE

In accordance with one feature of this disclosure, an apparatus is provided for releasably connecting two objects while allowing a limited pivoting motion between the two connected objects. The apparatus includes a first connector configured to be secured to a first object and a second connector configured to be secured to a second object. The first connector includes a first frame, a latch handle, and a latch post. The first frame includes a wall, a shaft fixed on the wall and extending outwardly from a side of the wall, and a head on the shaft and spaced from the wall, the head defining at least one shoulder surface extending radially outwardly from the shaft and facing the wall. The latch handle is mounted to the frame to move between an engaged position and a disengaged position with the wall extending between the latch handle and the shaft. The latch handle is biased toward the engaged position. The latch post is fixed on the handle and extends from a side of the handle facing the wall, the latch post extending past the side of the wall at a location spaced from the shaft with the latch handle in the engaged position. The second connector includes a second frame including a socket and an arcuate catch surface. The socket is configured to receive the head while allowing the head to rotate within the socket. A portion of the second frame extends between the at least one shoulder surface with the head received in the socket to connect the first connector to the second connector. The arcuate catch surface is spaced from the socket and extends between two circumferentially spaced stop surfaces. The arcuate catch surface is located to engage the latch post with the head received in the socket and the latch handle in the engaged position to restrict movement of the head out of the socket while allowing the head to rotate in the socket and the first connector to pivot relative to the second connector. The stop surfaces are located to engage the latch post to limit the pivoting motion of the first connector relative to the second connector with head received in the socket and the latch handle in the engaged position. The catch surface is located to not engage the latch post with head received in the socket and the latch handle in the disengaged position to allow the head to be removed from the socket.

In one feature, at least one of the latch post and the second frame include a cam surface configured to engage the other of the latch post and the second frame to force the latch handle to move toward the disengaged position as the head is inserted into the socket.

As one feature, the latch post and the second frame including mating cam surfaces that engage each other to force the latch handle to move toward the disengaged position as the head is inserted into the socket.

According to one feature, the latch handle is mounted to the first frame to pivot between the engaged and disengaged positions.

In one feature, the shaft is a cylindrical shaft, the head includes an annular rib extending outwardly from the shaft to define a cylindrical outermost perimeter of the head, and the at least one shoulder surface is an annular surface. In a further feature, the socket includes by a pair of spaced channels extending parallel to each other and sized to receive portions of the annular rib extending on opposite sides of the shaft. In yet a further feature, the socket further includes an arcuate stop surface extending between the channels to engage the outermost perimeter of the head.

As one feature, the latch post extends through an opening in the wall with the latch handle in the engaged position.

According to one feature, the catch surface and the stop surfaces are located in an accurate shaped recess in the second frame.

In one feature, the latch handle is located within a recess formed in the first frame.

According to one feature, the latch handle and the latch post are defined by one continuous piece of material.

As one feature, the first frame is defined by one continuous piece of material.

According to one feature, the first frame includes a mount structure for fixing the first object to the first connector; and the second connector further includes a retainer mounted to the second frame to allow at least a portion of the second object to be inserted between the retainer and the second frame. In a further feature, the mount structure includes a plurality of fastener receiving openings extending through the first frame, the retainer is mounted to the second frame to pivot between an open position wherein at least a portion of the second object can be inserted between the retainer and the second frame and a closed position wherein the at least a portion of the second object is sandwiched between the second frame and the retainer, and the second connector further includes a retainer lock extending between the retainer and the second frame to lock the retainer in the closed position. In a further feature, the first object is a tool pouch fixed to the mount structure by a plurality of fasteners and the second object is a belt having a portion trapped between the retainer and the second frame.

In accordance with one feature of this disclosure, a tool belt system is provided that allows a tool pouch to be releasably connected to a belt while allowing limited pivoting movement of the tool pouch relative to the belt. The system includes a first connector, a second connector releasably connectable with the first connector, a tool pouch secured to one of the first connector and the second connector; and a belt secured to the other of the first connector and the second connector. The first connector includes a first frame, a latch handle, and a latch post. The first frame includes a wall, a shaft fixed on the wall and extending outwardly from a side of the wall, and a head on the shaft and spaced from the wall, the head defining at least one shoulder surface extending radially outwardly from the shaft and facing the wall. The latch handle is mounted to the frame to move between an engaged position and a disengaged position with the wall extending between the latch handle and the shaft. The latch handle is biased toward the engaged position. The latch post is fixed on the handle and extends from a side of the handle facing the wall, the latch post extending past the side of the wall at a location spaced from the shaft with the latch handle in the engaged position. The second connector includes a second frame including a socket and an arcuate catch surface. The socket is configured to receive the head while allowing the head to rotate within the socket. A portion of the second frame extends between the at least one shoulder surface with the head received in the socket to connect the first connector to the second connector. The arcuate catch surface is spaced from the socket and extends between two circumferentially spaced stop surfaces. The arcuate catch surface is located to engage the latch post with the head received in the socket and the latch handle in the engaged position to restrict movement of the head out of the socket while allowing the head to rotate in the socket and the first connector to pivot relative to the second connector. The stop surfaces are located to engage the latch post to limit the pivoting motion of the first connector relative to the second connector with head received in the socket and the latch handle in the engaged position. The catch surface is located to not engage the latch post with head received in the socket and the latch handle in the disengaged position to allow the head to be removed from the socket.

In one feature, at least one of the latch post and the second frame include a cam surface configured to engage the other of the latch post and the second frame to force the latch handle to move toward the disengaged position as the head is inserted into the socket.

As one feature, the latch handle is mounted to the first frame to pivot between the engaged and disengaged positions.

According to one feature, the shaft is a cylindrical shaft, the head includes an annular rib extending outwardly from the shaft to define a cylindrical outermost perimeter of the head, the at least one shoulder surface is an annular surface, the socket includes by a pair of spaced channels sized to receive portions of the annular rib extending on opposite sides of the shaft, the latch post extends through an opening in the wall with the latch handle in the engaged position, and the catch surface and the stop surfaces are located in an accurate shaped recess in the second frame.

It should be understood that the inventive concepts disclosed herein do not require each of the features discussed above, may include any combination of the features discussed, and may include features not specifically discussed above.

BRIEF SUMMARY OF THE SEVERAL VIEWS OF THE DRAWINGS

FIGS. 6A-D are views similar to FIG. 5, but showing the quick connect as it is transitioned from disconnected condition to a connected condition;

FIGS. 7A-7C are section views taken from line 7-7 in FIG. 5, with FIG. 7A showing the quick connect in a first pivot position, FIG. 7B showing the quick connect in a second pivot position, and FIG. 7C showing the quick connect in a third pivot position;

FIG. 8 is an enlarged, partial section view taken from line 8-8 in FIG. 7A;

FIG. 9 is a perspective view from the side of one the connectors of the quick connect of FIGS. 1-8;

FIG. 10 is a front elevation view of the connector of FIG. 9;

FIG. 11 is a back elevation view of the connector of FIG. 9;

FIG. 12 is a view taken from line 12-12 in FIG. 10;

FIG. 13 is an exploded perspective view of the connector of FIGS. 9-12;

FIG. 14 is a front elevation view of the other connector of the quick connect shown in FIGS. 1-8;

FIG. 15 is a view taken from line 15-15 in FIG. 14 showing a retainer component in an open position to allow a tool belt to be inserted; and FIG. 16 is a view similar to FIG. 15 but showing the retainer component in a closed position with a belt sandwiched between the retainer component and another portion of the connector of FIG. 14; and FIG. 17 is an exploded perspective view of the connector of FIGS. 14-16.

DETAILED DESCRIPTION OF PREFERRED EMBODIMENTS

Figure 1:
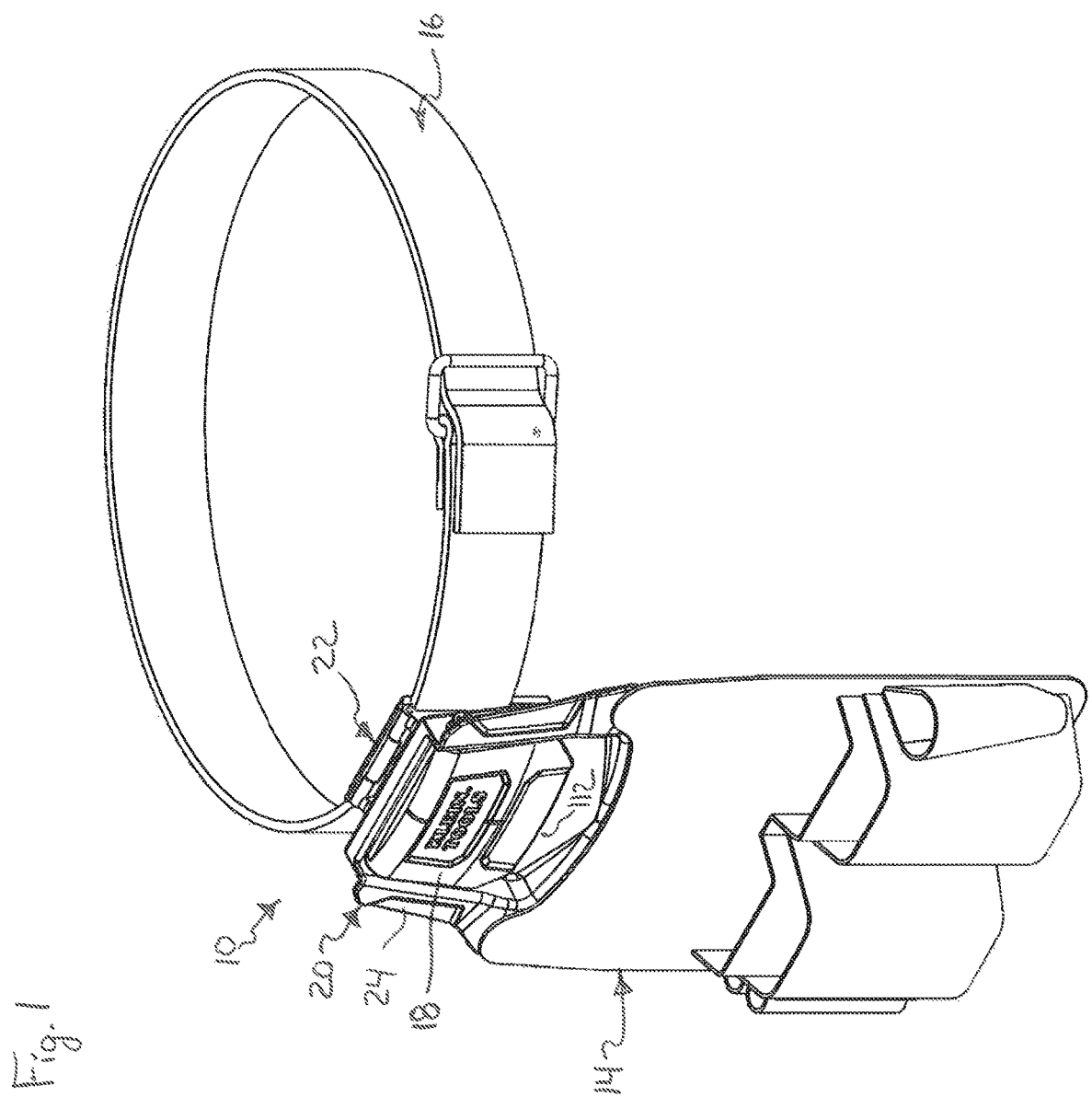
FIG. 1 is a view of a perspective view from the above and to the front of a modular tool belt system including a tool pouch connected to a tool belt by a quick connect having a pair of connectors that can pivot relative to each other over a limited range of motion according to this disclosure.
Figure 2:
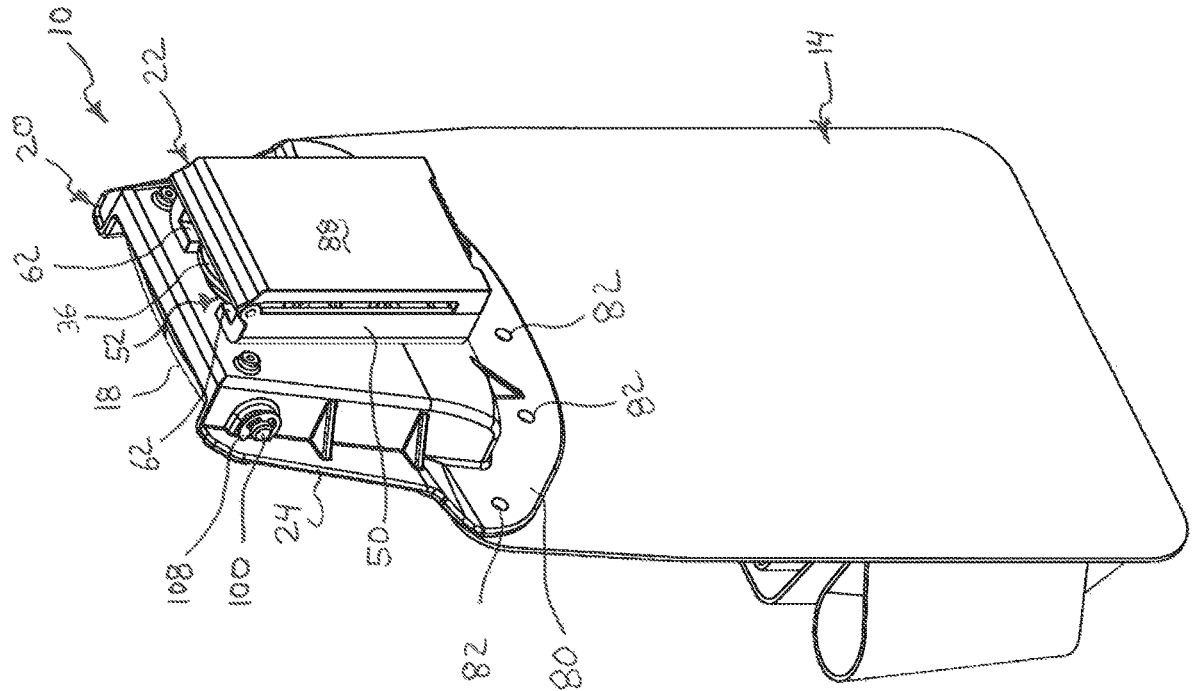
FIG. 2 is a perspective view from above and to the back of the tool pouch and the quick connect of FIG. 1.
Figure 3:
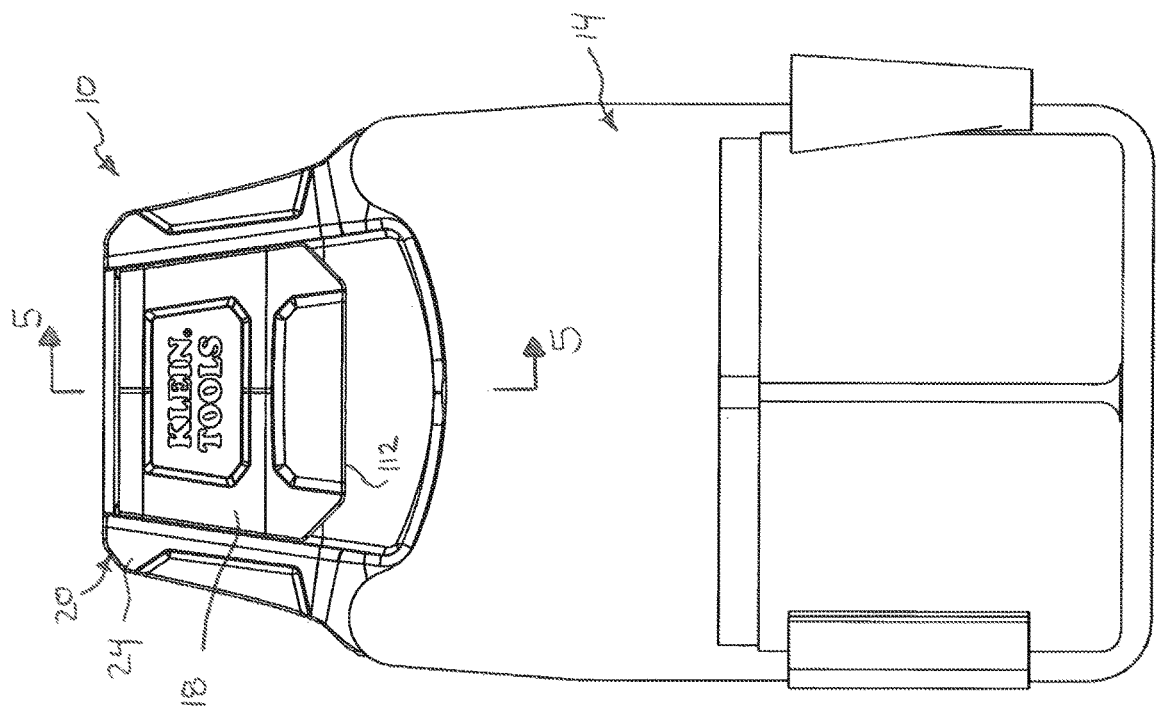
FIG. 3 is a front elevation view of the tool pouch and the quick connect of FIG. 2.
Figure 4:
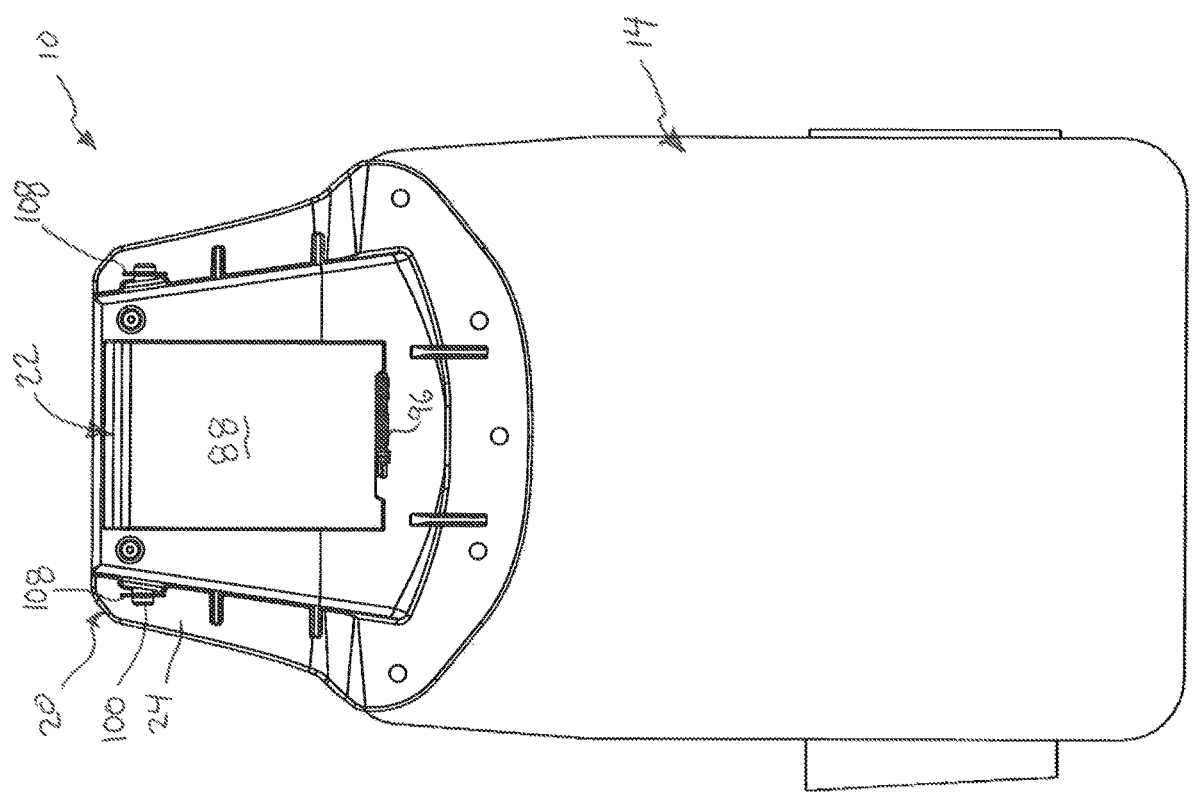
FIG. 4 is a back elevation view of the tool pouch and quick connect of FIG. 2.

As best seen in FIG. 1 an apparatus in the form of a quick connect 10 is provided to releasably connect two objects 14 and 16 while allowing a limited pivot motion between the two connected objects 14 and 16. In the illustrated and preferred embodiment, the object 14 is a tool pouch 14, the object 16 is a tool belt 16 and the quick connect 10 allows the tool pouch 14 to: be easily connected to the belt by moving the pouch 14 in a downward direction relative to the belt 16; to pivot over a limited range of motion relative to the belt 16 while the tool pouch 14 is connected via the quick connect 10 to the belt 16; and to be easily disconnected from the belt 16 via a user actuatable latch handle 18. As best seen in FIGS. 2-4, the quick connect 10 includes a first connector 20 configured to be secured to the tool pouch 14 and a second connector 22 configured to be secured to the belt 16. It should be appreciated that while the quick connect 10 is shown in a preferred application for use with the tool pouch 14 and tool belt 16, the quick connect 10 can be adapted for use with other objects depending upon the requirements of each particular application.

Figure 5:
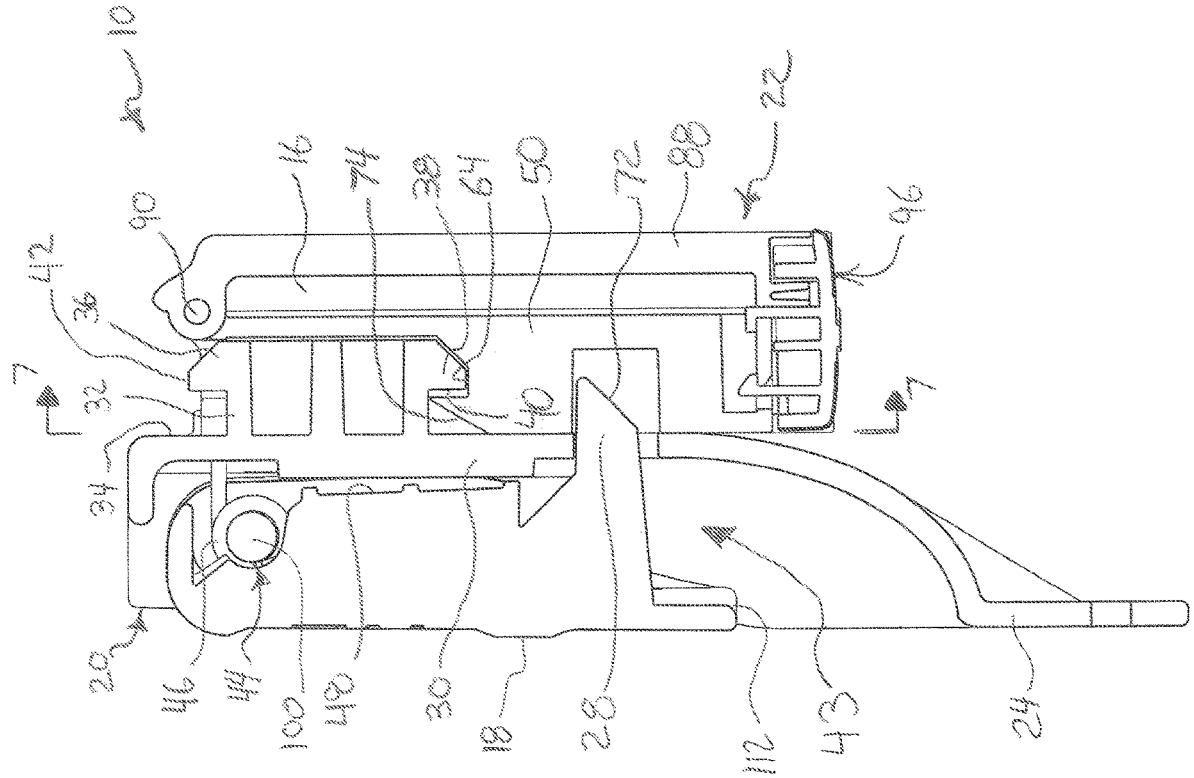
FIG. 5 is an enlarged, cross-sectional view taken from line 5-5 in FIG. 3, but showing only the quick connect.

The first connector 20 includes a frame 24, the user actuatable latch handle 18, and a latch post 28, as best seen in FIGS. 5 and 6A-D, and 9-15. The frame 24 includes a wall 30, a cylindrical shaft 32 fixed on the wall 30 and extending outwardly from a side 34 of the wall 30, and a head 36 on the shaft 32 and spaced from the wall 30. The head 36 includes an annular rib 38 extending radially outwardly from the shaft 32 to define an annular shoulder surface 40 and a cylindrical outermost perimeter 42 of the 36. The wall 30 extends between the latch handle 18 and the shaft 32, with the latch handle 18 being located in a recess 43 formed in the frame 24 in the illustrated embodiment. The latch handle 18 is mounted to the frame 24 by a pivot connection 44 so that the handle 18 can be moved between an engaged position, shown in FIGS. 5 and 6D, and a disengaged position, such as the positions shown in FIGS. 6C and 9. A pair of coiled torsion springs 46 are pre-loaded between the frame 24 and the handle 18 to bias the handle 18 toward the engaged position. The latch post 28 is fixed on the handle 18 for movement therewith between the engaged and disengaged positions. As best seen in FIGS. 5 and 6D, the latch post 28 extends from a side 48 of the latch handle 18 facing the wall 30 at a location spaced from the shaft 32 with the latch handle 18 in the engaged position. As best seen in FIGS. 5, 6D, 11, and 12, it is preferred that the latch post 28 extend through an opening 49 formed in the wall 30 of the frame 24 with the latch handle 18 in the engaged position. As best seen in FIG. 11, in the illustrated embodiment, the opening 49 is provided in the form of an arcuate slot, but it should be understood that the opening 49 can have any desired shape that provides clearance for the post 28 to pass through the wall 30. In the illustrated and preferred embodiment, the frame 24, including the wall 30, the shaft 32 and the head 36, is a unitary, one-piece construction (i.e., made from a single, continuous piece of material) and the latch handle 18; and the latch post 28 are a unitary, one-piece construction (i.e., made from a single, continuous piece of material).

The second connector 22 includes a frame 50 having a socket 52 and an arcuate catch surface 54 spaced from the socket 52 and extending between two circumferentially spaced stop surfaces 56 and 58, as best seen in FIG. 14. The socket 52 is configured to receive the head 36 while allowing the head 36 to rotate within the socket 52, as best seen in FIGS. 6A-D and 7A-C. As best seen in FIG. 8, portions 60 of the frame 50 extend between the annular shoulder surface 40 with the head 36 received in the socket 52 to connect the first connector 20 to the second connector 22. As best seen in FIGS. 5, 6D, and 7A-C, the arcuate catch surface 54 is located to engage the latch post 28 with the head 36 received in the socket 52 and the latch handle 18 in the engaged position to restrict movement of the head 36 out of the socket 52 while allowing the head 36 to rotate in the socket 52 and the first connector 20 to pivot relative to the second connector 22. The arcuate catch surface 54 is located so as not to engage the latch post 28 with the head 36 received in the socket 52 and the latch handle 18 in the disengaged position to allow the head 36 to be removed from the socket 52. As best seen in FIGS. 7B and 7C, the stop surfaces 56 and 58 limit the amount of pivot motion between the first and second connectors 20 and 22 by engagement with the latch post 28 as the first and second connectors 20 and 22 pivot relative to each other with the head 36 received in the socket 52 and the latch handle 18 in the engaged position. In the illustrated and preferred embodiment, the socket 52 includes a pair of spaced channels 62 extending parallel to each other and sized to receive portions of the annular rib 38 extending on opposite sides of the shaft 32 (best seen in FIG. 8), and an arcuate stop surface 64 extending between the channels 62 to engage the outermost perimeter 42 of the head 36 (best seen in FIGS. 5 and 6D). As shown in the illustrated embodiment, it is preferred that the arcuate catch surface 54 and the stop surfaces 56 be located in an arcuate shaped recess 70 formed in the second frame 50.

As shown in the illustrated embodiment, it is preferred that the latch post 28 and the second frame 50 include mating cam surfaces 72 and 74, respectively, that engage each other to force the latch handle 18 to pivot toward the disengaged position as the head 36 is being inserted into the socket 50. This is illustrated by the connection sequence shown in FIGS. 6A-6D, with FIG. 6A showing the connectors 20 and 22 as the head 36 is inserted into the socket 52, FIGS. 6B and 6C showing the connectors 20 and 22 as the head 36 is forced further into the socket, and FIG. 6D showing the connectors 20 and 22 in a fully engaged position/condition. In the illustrated embodiments, the cam surface 72 is formed as an angled bevel on the end of the latch post 28, and the came surface 74 is an arcuate surface formed as an angled bevel adjacent the bottom of the socket 52.

The frame 24 of the connector 20 includes a mount structure 80 for fixing the tool pouch 14 to the connector 20. As best seen in 9-11, the mount structure of the illustrated embodiment includes a plurality of fastener receiving openings in the form of cylindrical through bores 82 that extend through the frame 24 to receive any suitable fastener, such as a rivet or threaded fastener, to attach the tool pouch 14 to the frame 24. It should be understood that the illustrated embodiment shows only one possible form for the mount structure 80, but any suitable mount structure can be utilized for the mount structure 80 according to this disclosure depending upon the particular form, configuration, and type of object that is to be attached to the connector 20. Accordingly, no limitations to a particular configuration of mount structure is intended unless expressly recited in one of the claims appended hereto.

As best seen in FIGS. 16-18, in the illustrated embodiment, the connector 22 includes a mount structure 86 in the form of a retainer 88 mounted to the frame 50 to allow a portion of the belt 16 to be inserted between the retainer 88 and the frame 50. The retainer 88 is mounted to the frame 50 to pivot between an open position, such as shown in FIG. 15, wherein a portion of the belt 16 can be inserted between the retainer 88 and the frame 50, and a closed position, shown in FIG. 16, wherein the portion of the belt 16 is sandwiched between the retainer 88 and the frame 50. In the illustrated embodiment, the retainer is pivot mounted to the frame 50 by a pivot pin 90 that is received in hinge barrels 92 formed in the frame 50 and a hinge barrel 94 formed in the retainer 88. Preferably, the pin 90 will be press fit or bonded into the barrels 92. It should be understood that while a preferred configuration is shown for mounting the retainer 88 to the frame 50, any suitable mount configuration can be used that allows the retainer 88 to move between open and closed positions. Accordingly, no limitation to a specific mount configuration is intended unless expressly recited in a claim appended hereto. In the illustrated embodiment, the connector 22 includes a user actuated retainer lock 96 extending between the retainer 88 and the frame 50 to selectively lock the retainer 88 in the closed position. The retainer lock 96 is shown as a latch that is mounted to the frame 80 to translate laterally between an unlocked position where the retainer 88 is free to move between the closed and open positions, and a locked position wherein the retainer is restrained against movement from the closed position by the lock 96. In the illustrated embodiment, the lock 96 is maintained in the locked position by engaged, snap fit features 97 and 98 on the lock 96 and the retainer 88, respectively. It should be understood that the illustrated embodiment shows only one possible form for the mount structure 86, but any suitable mount structure can be utilized for the mount structure 86 according to this disclosure depending upon the particular form, configuration, and type of object that is to be attached to the connector 22. Accordingly, no limitations to a particular configuration of mount structure is intended unless expressly recited in one of the claims appended hereto.

In the illustrated embodiment, the pivot connection 44 is provided by a pivot pin 100 that is received in a pair of laterally spaced openings 102 formed on the latch handle 18 and a pair of laterally spaced openings 104 formed in sidewalls 106 of the frame 24. C-shaped spring clips 108 are received in annular grooves 110 formed in opposite ends of the pin 100 to retain the pin 100 in the bosses 102 and openings 104. It should be understood that while a preferred configuration is shown for mounting the latch handle 18 to the frame 24, any suitable mount configuration can be used that allows the latch handle 18 to move between engaged and disengaged positions. Accordingly, no limitation to a specific mount configuration is intended unless expressly recited in a claim appended hereto.

In operation, a user will typically be wearing the belt 16 and will grasp the bottom edge 112 of the handle 18 by inserting the tips of one or more fingers between the handle 18 and the frame 24 adjacent the edge 112 and will actuate the handle 18 from the engaged position to the disengaged position while lifting the connector 20 and pouch 14 so that the head 36 slides upward and out of engagement with the socket 52 so as to disengage the connectors 20 and 22 and remove the pouch 14 from connection with the belt 16. To reconnect, the user can grasp any part of the connector 20 and slide the head 36 into engagement with the socket 52, forcing the head 36 downward into the socket 52 until the latch post 28 engages the catch surface 54, as shown by the sequence illustrated in FIGS. 6A-D.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the quick connect 10 are shown in the figures, it should be understood that this disclosure anticipates variations in the specific details of each of the disclosed components and features of the quick connect 10 and that no limitation to a specific form, configuration, or detail is intended unless expressly and specifically recited in an appended claim.

For example, while specific and preferred forms have been shown for the frames 24 and 50, other suitable forms may be utilized depending upon the requirements of each particular application. As a further example in this regard, while it is preferred that the shaft 32, head 36, and mount structure 40 all be formed as a single unitary components (i.e, formed from a single piece of material), in some applications it may be desirable for one or more of those features to be a separate component that is assembled or permanently joined to the remainder of the frame 24. As another example, while the shaft 32 is shown as having a cylindrical outermost surface and the head has circular cross-sectional shapes, other shapes, such as polygonal or oval, may be desirable depending upon the requirements of each application. As a further example, while the socket is shown as having the two u-shaped channels 62 that extend parallel to each other, other configurations may be desirable depending upon the requirements of each application, including channels that are non-parallel and/or slots that extend through a wall structure. In another example, while the latch post 28 and the second frame 50 each have a cam surface 72 and 74, respectively, in some applications it may be desirable for only one of the latch post 28 and the frame 50 to have a cam surface, or for neither of the latch post 28 and the frame 50 to have a cam surface. As yet another example, while it is preferred for the arcuate catch surface 54 and the stop surfaces 56 and 58 to be provided in the recess 70 formed in the frame 50, in some applications it may be desirable to provide the surfaces 54, 56, and 58 in different structure, such as, for example, providing the arcuate surface 54 along a bottom edge of the frame 50, with the surfaces 56 and 58 being provided on ribs that extend downward from the bottom edge. In a further example, while it is preferred to pivot mount the handle 18 to the frame 24, in some applications it may be desirable to mount the handle 18 for another type of relative motion relative to the frame between the engaged and disengaged positions, such as for example, mounting the handle 18 so that it translates relative to the frame 24 between the engaged and disengaged positions. As another example, while the torsion springs 46 are preferred, in some applications it may be desirable to utilize a single spring and/or a different form or configuration of spring, such as for example, a helical compression spring, a clock (spiral) spring, or a leaf spring. In another example, while it is preferred that the latch post 28 extend through the opening 49 in the wall 30 of the frame 24, in some applications it may be desirable for the latch post 28 to extend past/below a lowermost edge of the wall 30.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus for releasably connecting two objects while allowing a limited pivoting motion between the two connected objects, the apparatus comprising:
   a first connector configured to be secured to a first object, the first connector comprising:
      a first frame including a wall, a shaft fixed on the wall and extending outwardly from a side of the wall, a head on the shaft and spaced from the wall, the head defining at least one shoulder surface extending radially outwardly from the shaft and facing the wall; and
      a latch handle mounted to the frame to move between an engaged position and a disengaged position with the wall extending between the latch handle and the shaft, the latch handle biased toward the engaged position; and a latch post fixed on the handle and extending from a side of the handle facing the wall, the latch post extending past the side of the wall at a location spaced from the shaft with the latch handle in the engaged position; and a second connector configured to be secured to a second object, the second connector comprising:

a second frame including:

a socket configured to receive the head while allowing the head to rotate within the socket, a portion of the second frame extending between the at least one shoulder surface with the head received in the socket to connect the first connector to the second connector; and an arcuate catch surface spaced from the socket and extending between two circumferentially spaced stop surfaces, the arcuate catch surface located to engage the latch post with the head received in the socket and the latch handle in the engaged position to restrict movement of the head out of the socket while allowing the head to rotate in the socket and the first connector to pivot relative to the second connector, the stop surfaces located to engage the latch post to limit the pivoting motion of the first connector relative to the second connector with the head received in the socket and the latch handle in the engaged position, the catch surface located to not engage the latch post with head received in the socket and the latch handle in the disengaged position to allow the head to be removed from the socket.

2. The apparatus of claim 1 wherein at least one of the latch post and the second frame comprise a cam surface configured to engage the other of the latch post and the second frame to force the latch handle to move toward the disengaged position as the head is inserted into the socket.

3. The apparatus of claim 1 wherein the latch post and the second frame includes mating cam surfaces that engage each other to force the latch handle to move toward the disengaged position as the head is inserted into the socket.

4. The apparatus of claim 1 wherein the latch handle is mounted to the first frame to pivot between the engaged and disengaged positions.

5. The apparatus of claim 1 wherein the shaft is a cylindrical shaft, the head comprises an annular rib extending outwardly from the shaft to define a cylindrical outermost perimeter of the head, and the at least one shoulder surface is an annular surface.

6. The apparatus of claim 5 wherein the socket includes a pair of spaced channels extending parallel to each other and sized to receive portions of the annular rib extending on opposite sides of the shaft.

7. The apparatus of claim 6 wherein the socket further includes an arcuate stop surface extending between the channels to engage the outermost perimeter of the head.

8. The apparatus of claim 1 wherein the latch post extends through an opening in the wall with the latch handle in the engaged position.

9. The apparatus of claim 1 wherein the catch surface and the stop surfaces are located in an accurate shaped recess in the second frame.

10. The apparatus of claim 1 wherein the latch handle is located within a recess formed in the first frame.

11. The apparatus of claim 1 wherein the latch handle and the latch post are defined by one continuous piece of material.

12. The apparatus of claim 1 wherein the first frame is defined by one continuous piece of material.

13. The apparatus of claim 1 wherein:

the first frame comprises a mount structure for fixing the first object to the first connector; and the second connector further comprises a retainer mounted to the second frame to allow at least a portion of the second object to be inserted between the retainer and the second frame.

14. The apparatus of claim 13 wherein:

the mount structure comprises a plurality of fastener receiving openings extending through the first frame;

the retainer is mounted to the second frame to pivot between an open position wherein at least a portion of the second object can be inserted between the retainer and the second frame and a closed position wherein the at least a portion of the second object is sandwiched between the second frame and the retainer; and the second connector further comprises a retainer lock extending between the retainer and the second frame to lock the retainer in the closed position.

15. The apparatus of claim 13 further comprising the first and second objects; and wherein the first object is a tool pouch fixed to the mount structure by a plurality of fasteners and the second object is a belt having a portion trapped between the retainer and the second frame.

16. A tool belt system that allows a tool pouch to be releasably connected to a belt while allowing limited pivoting movement of the tool pouch relative to the belt, the system comprising:

a first connector;

a second connector releasably connectable with the first connector;

a tool pouch secured to one of the first connector and the second connector; and a belt secured to the other of the first connector and the second connector;

wherein:

the first connector comprises:

a first frame including a wall, a shaft fixed on the wall and extending outwardly from a side of the wall, a head on the shaft and spaced from the wall, the head defining at least one shoulder surface extending radially outwardly from the shaft and facing the wall;

a latch handle mounted to the frame to move between an engaged position and a disengaged position with the wall extending between the latch handle and the shaft, the latch handle biased toward the engaged position; and a latch post fixed on the handle and extending from a side of the handle facing the wall, the latch post extending past the side of the wall at a location spaced from the shaft with the latch handle in the engaged position; and the second connector comprises:

a second frame including:

a socket configured to receive the head while allowing the head to rotate within the socket, a portion of the second frame extending between the at least one shoulder surface with the head received in the socket to connect the first connector to the second connector; and an arcuate catch surface spaced from the socket and extending between two circumferentially spaced stop surfaces, the arcuate catch surface located to engage the latch post with the head received in the socket and the latch handle in the engaged position to restrict movement of the head out of the socket while allowing the head to rotate in the socket and the first connector to pivot relative to the second connector, the stop surfaces located to engage the latch post to limit the pivoting motion of the first connector relative to the second connector with head received in the socket and the latch handle in the engaged position, the catch surface located to not engage the latch post with the head received in the socket and the latch handle in the disengaged position to allow the head to be removed from the socket.

17. The system of claim 16 wherein at least one of the latch post and the second frame comprise a cam surface configured to engage the other of the latch post and the second frame to force the latch handle to move toward the disengaged position as the head is inserted into the socket.

18. The system of claim 16 wherein the latch handle is mounted to the first frame to pivot between the engaged and disengaged positions.

19. The system of claim 16 wherein:
the shaft is a cylindrical shaft,
the head comprises an annular rib extending outwardly from the shaft to define a cylindrical outermost perimeter of the head,
the at least one shoulder surface is an annular surface,
the socket includes a pair of spaced channels sized to receive portions of the annular rib extending on opposite sides of the shaft,
the latch post extends through an opening in the wall with the latch handle in the engaged position, and
the catch surface and the stop surfaces are located in an accurate shaped recess in the second frame.

* * * * *